F. R. PORTER.
SLEEVE VALVE ENGINE.
APPLICATION FILED DEC. 28, 1915.
1,214,822.
Patented Feb. 6, 1917.
5 SHEETS—SHEET 3.
Fig. 4.
Fig. 3.
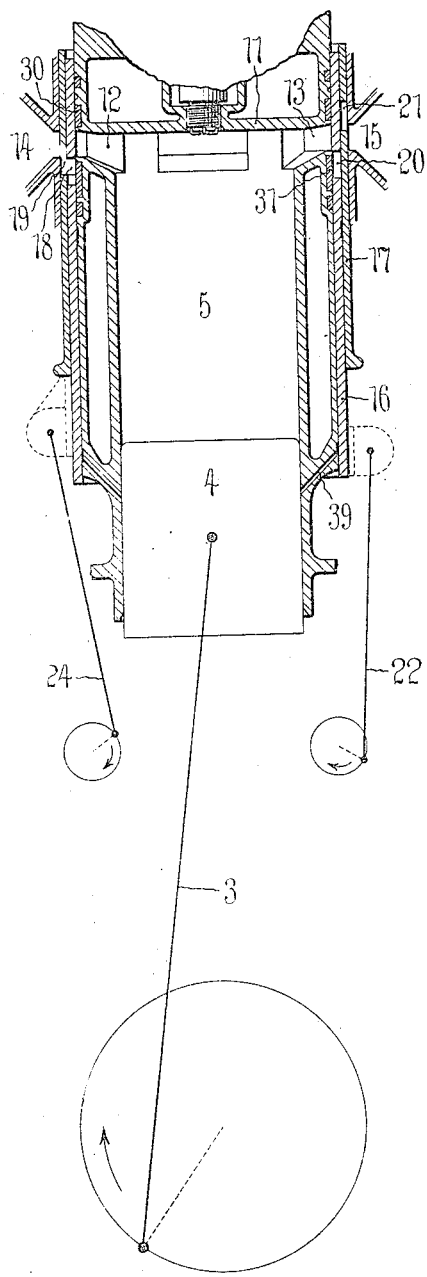
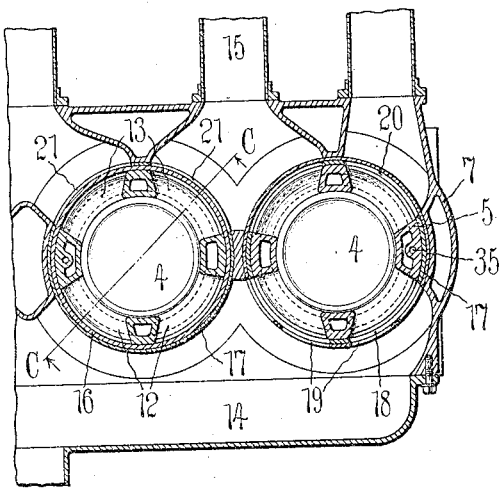
Witness:
Harry G. Fleischer
Inventor:
Finley R Porter
by attorneys

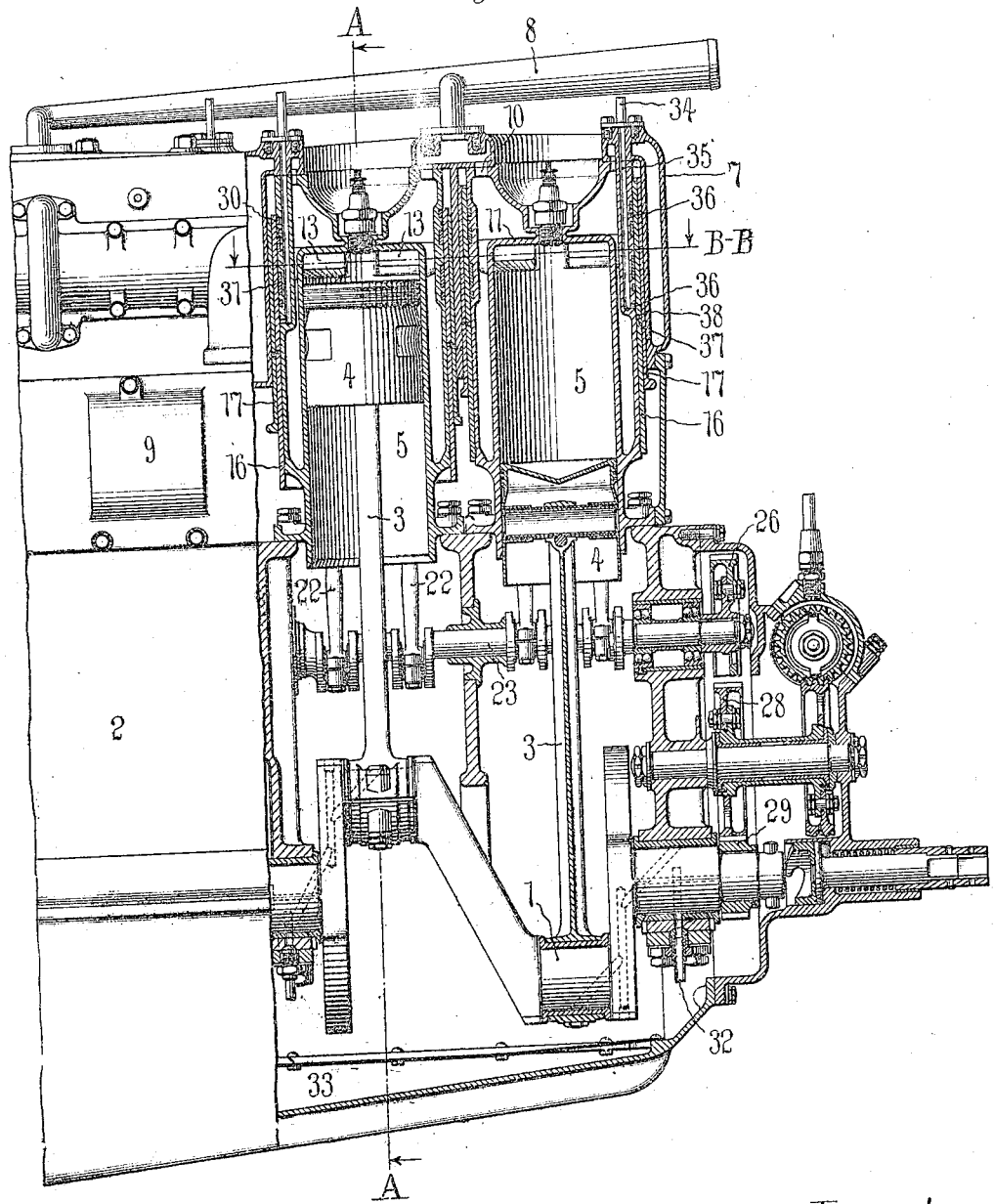

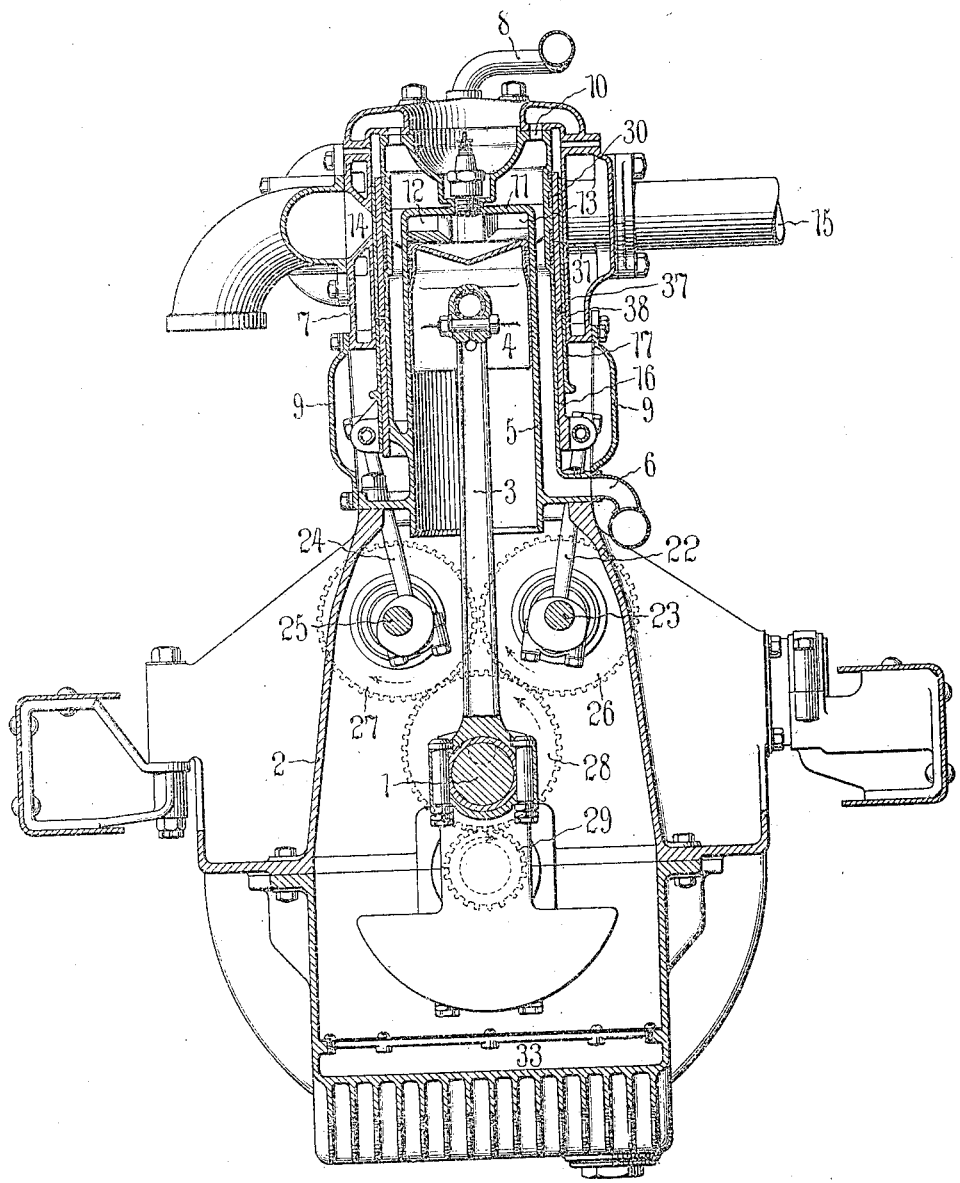

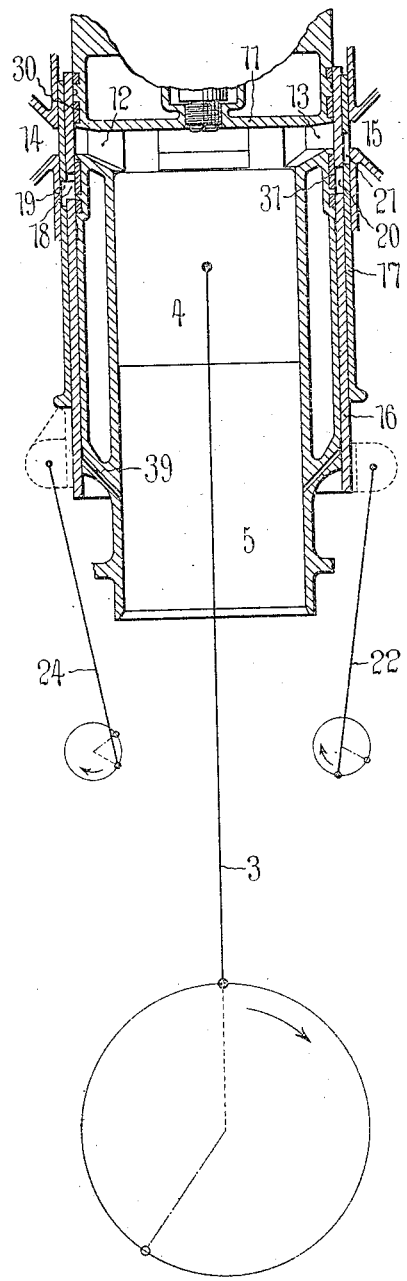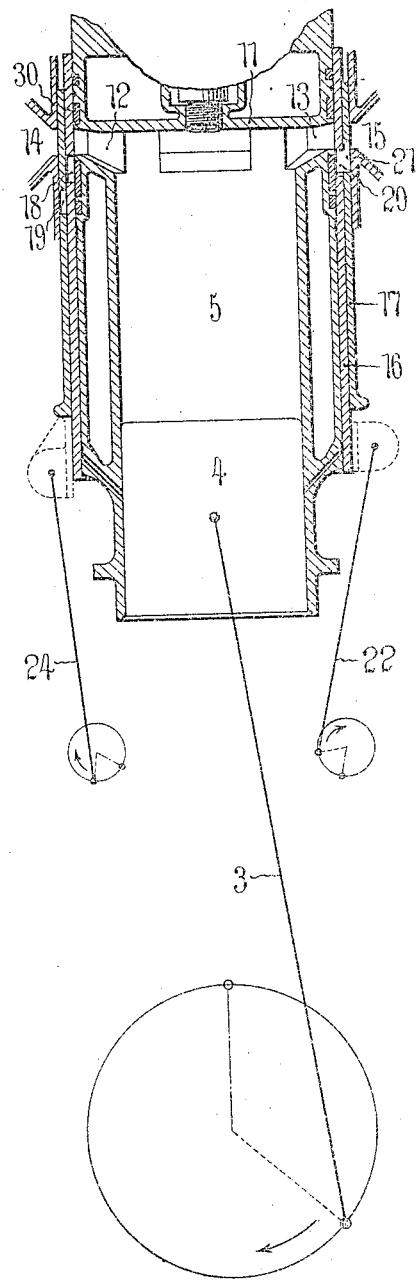

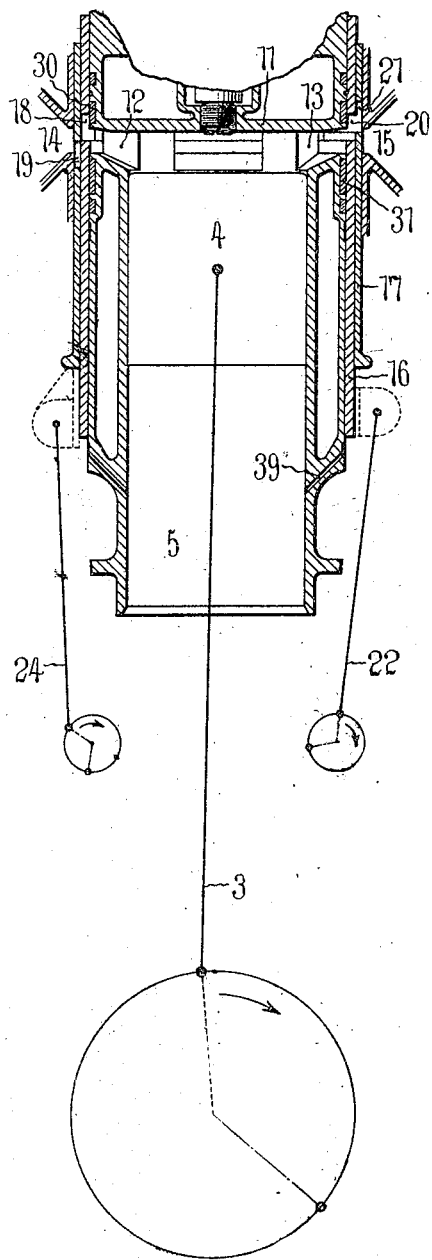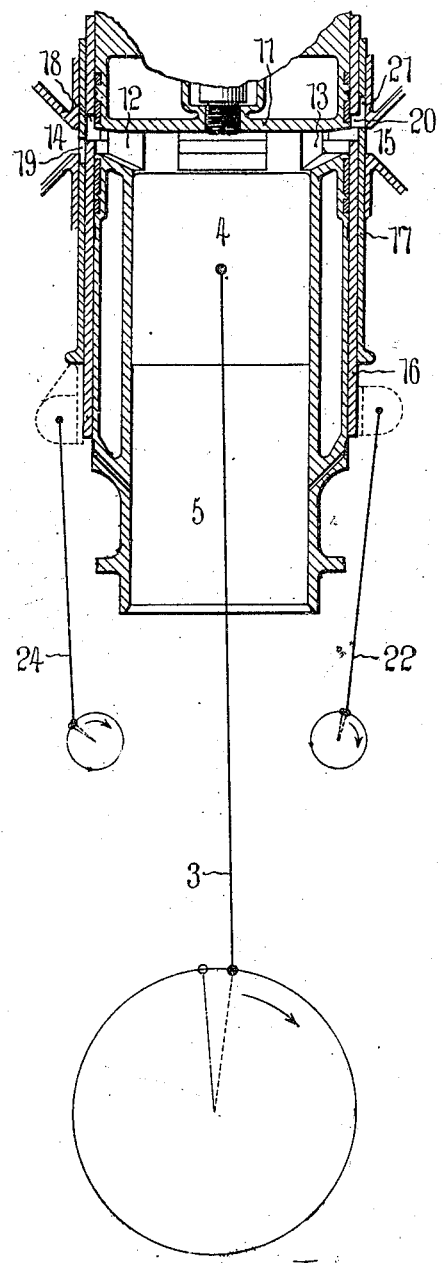

UNITED STATES PATENT OFFICE.

FINLEY R. PORTER, OF PORT JEFFERSON, NEW YORK, ASSIGNOR, BY DIRECT AND MESNE ASSIGNMENTS, TO KNIGHT AMERICAN PATENTS COMPANY, OF CHICAGO, ILLINOIS, A CORPORATION OF DELAWARE.

SLEEVE-VALVE ENGINE.

1,214,822.   Specification of Letters Patent.   Patented Feb. 6, 1917.

Application filed December 28, 1915. Serial No. 69,021.

*To all whom it may concern:*

Be it known that I, FINLEY R. PORTER, a citizen of the United States, and resident of Port Jefferson, in the county of Suffolk and State of New York, have invented a new and useful Improvement in Sleeve-Valve Engines, of which the following is a specification.

The object of my invention broadly is to provide a sleeve valve engine which will be capable of very high speed without danger of the breakage of parts and in which the proper lubrication of the working parts is insured without excessive smoking at the exhaust.

A practical embodiment of my invention is represented in the accompanying drawings, in which—

Figure 1 is a detail view partly in side elevation and partly in section, illustrating a multi-cylinder explosion engine, with my improvements embodied therein, Fig. 2 is a transverse vertical section taken in the plane of the line A—A of Fig. 1, looking in the direction of the arrows, Fig. 3 is a detail horizontal section taken in the plane of the line B—B of Fig. 1, looking in the direction of the arrows, and Figs. 4, 5, 6, 7 and 8, are detail vertical sections taken in the plane of the line C—C of Fig. 3, showing the piston and sleeve valves in various positions, the operating means for the piston and valves being indicated diagrammatically in their relative positions in each figure.

The crank shaft 1 is suitably mounted in a casing 2, which shaft is provided with a piston rod 3 connected to a piston 4 which reciprocates within an inner cylinder 5. The head and side walls of this inner cylinder 5 are jacketed and an inlet 6 is provided at the bottom of the inner cylinder for the introduction of the cooling medium. This inner cylinder 5 is supported on the casing 2 in a fixed position by any suitable means.

An outer cylinder 7 surrounds the inner cylinder 5 and is spaced therefrom and head and side walls of the outer cylinder 7 are also jacketed and the cylinder is provided with an outlet 8 for the cooling medium, it being understood that a circulation of the cooling medium is provided for by any suitable means, not shown herein. The outer cylinder 7 is held in a fixed position by mounting its head directly upon the head of the inner cylinder and by providing the side plates 9.

Ports 10 bring the cooling space of the inner cylinder jacket into open communication with the cooling space of the outer cylinder jacket.

The inner end wall 11 of the inner cylinder is preferably made flat and the inner cylinder is provided with suitable inlet and outlet ports 12 and 13, respectively, located adjacent to the inner end wall 11 and leading through the inner cylinder jacket to the exterior thereof.

The outer cylinder 7 is provided with suitable inlet and outlet ports 14 and 15, respectively, arranged in alinement with the inlet and outlet ports 12 and 13, respectively, of the inner cylinder, which ports in the outer cylinder lead through the jacket and open to the inner and outer walls of said outer cylinder.

The admission of the motive fluid to the inlet ports 14 of the outer cylinder may be provided for in any suitable manner.

Inner and outer telescoping sleeve valves 16 and 17, respectively, are interposed between the outer wall of the inner cylinder and the inner wall of the outer cylinder, so that these two sleeve valves work on cooled surfaces. These inner and outer sleeve valves are provided with inlet ports 18, 19, respectively, arranged to be brought into and out of coaction with each other and the inlet ports 12 and 14 of the inner and outer cylinders, respectively. These inner and outer sleeve valves are also provided with outlet ports 20 and 21, respectively, arranged to be brought into and out of coaction with each other and the outlet ports 13 and 15 of the inner and outer cylinders, respectively.

The inner sleeve valve is connected by a rod 22 to a crank shaft 23 suitably mounted in the casing 2 and the outer sleeve valve is connected by a rod 24 to a crank shaft 25 also suitably mounted in the casing 2. These two crank shafts are driven in the same direction as the crank shaft 1 and at one-half the rotary speed thereof. In the present instance, through the gears 26, 27, 28, 29.

Suitable packing rings 30, 31, are provided in the outer wall of the inner cylinder above and below the inlet and outlet ports 12, 13, for engagement with the inner sleeve valve 16.

The relative movements of the sleeve valves with respect to the piston are such that the inlet ports of the sleeve valves open communication between the inlet ports 12 and 14 of the inner and outer cylinders, by a movement of the ports in opposite directions from substantially the middle of the cylinder ports, the inner sleeve valve traveling downwardly and the outer sleeve valve traveling upwardly. The inlet ports of the inner and outer sleeve valves close communication between the inlet ports 12 and 14, by a movement of the sleeve valve ports in a downward direction, the actual closing occurring at the bottom of the inlet port 12.

The outlet ports of the inner and outer sleeve valve open communication between the outlet ports 13 and 15 of the inner and outer cylinders, respectively, by a movement in an upward direction, the actual opening taking place at the bottom of the outlet port 13 of the inner cylinder. These outlet ports of the inner and outer sleeves close communication between the cylinder at the ports 13 and 15 by a movement of the sleeve ports in opposite directions, the inner sleeve valve traveling downwardly and the outer sleeve valve traveling upwardly, the actual closing occurring at the top of the outer cylinder outlet port 15.

The relative movements of the sleeves and their ports with respect to the movement of the piston, can be readily followed by reference to Figs. 4 to 8 inclusive.

In Fig. 4 the communication between the inlet ports 12 and 14 has just been closed and the piston 4 has started on its upward or compression stroke.

In Fig. 5, the compression stroke of the piston 4 has been completed and the piston is about to start downwardly on its expansion stroke. Both the inlet and outlet ports are still closed.

In Fig. 6 the piston 4 is about completing its expansion stroke and the exhaust ports are just starting to be opened.

In Fig. 7 the piston 4 has almost completed its burned gases expulsion stroke and the outlet ports are just about to be closed.

In Fig. 8 the work piston is just about starting its suction stroke and the inlet ports are just opening to admit the fresh supply of motive fluid.

It is to be understood that the movements of the parts are so timed that the full opening of the inlet and exhaust ports occur at the proper times to obtain the best effects, the timing herein illustrated diagrammatically being one which I have found to be effective.

By opening the outlet port of the inner sleeve off the bottom of the outlet port of the inner cylinder, it will be seen that the packing rings above and below the outlet port 13 are fully protected from the blast of the escaping burned gases, thus materially prolonging the life of these packing rings and permitting a better lubrication thereof.

In the lubrication of the working parts of this engine, I provide one system of lubrication for the piston and another system of lubrication for the sleeve valves and by these means I am enabled to accurately adjust the lubrication. In the present instance I have shown the lubrication of the piston by the usual recirculating oiling system in which the oil is introduced to the crank shaft 1 from the circulating pump, not shown, through the feed pipe 32, and is led from the pan 33 through a suitable connection, also not shown, back to the circulating pump.

The oil thrust from the cranks into the inner cylinder serves to lubricate the piston, as is usual.

The sleeve valves may be lubricated by a non-circulating oiling system, as, for instance, by a feed pipe 34 leading from a suitable oil reservoir, not shown. This feed pipe communicates with a vertical channel 35 passing through the heads of the outer and inner cylinders, said channel being provided with suitable ports 36 leading outwardly to the outer surface of the inner cylinder. The inner and outer sleeves may be provided with through ports 37, 38, respectively, which are brought into and out of communication with each other and with the ports 36.

If so desired, oil ports 39 may be provided leading from the interior of the inner cylinder to the exterior thereof near the bottom of the cylinder, as an additional oiling means for the work piston.

From the above description, it will be seen that the working piston slides in a cooled cylinder and that the telescoping sleeve valves slide between cooled surfaces, the inner sleeve valve sliding on the cooled surface of the inner cylinder and the outer sleeve valve sliding on the cooled surface of the outer cylinder. This arrangement effectually prevents the overheating of the piston and the sleeve valves, thereby rendering the lubrication of the piston and sleeve valves more effective, and economic.

By locating the telescoping sleeve valves exterior to the working cylinder and cooling cylinder, I am enabled to produce efficient engines of any desired bores even down to very small bores without widening the cylinder ports to such an extent as would require an undue travel of the sleeve valves. I have also eliminated all side thrust on the sleeves and have so arranged the sleeves as to materially facilitate access thereto.

By placing the packing or expansion rings for the inner sleeve valve on the cooled surface of the inner cylinder, all liability of the rings sticking from undue heat is obviated. Also the relative movements of the sleeve valves whereby the admission of the motive fluid is obtained by the opposite opening movement of the sleeve valve ports from the middle of the cylinder ports, the opening of the exhaust by a movement of the inner sleeve valve port off from the bottom of the inner cylinder port, and the closing of the exhaust by a movement of the outer sleeve port onto the top of the cylinder port, insures a highly efficient engine. This arrangement permits the rapid admission of the motive fluid without initial wall friction, and the closing of the exhaust without danger of trapping the burned gases at the final closing of the ports.

By providing separate oiling systems for the piston and the sleeve valves, I am enabled to simultaneously supply the relatively large amount of oil needed to lubricate the piston (whose linear travel is large) and the relatively small amount of oil needed for properly lubricating the sleeve valves (whose linear travel is small), thus reducing, to a minimum, the smoking of the engine at the exhaust; an objectionable feature of sleeve valve engines as usually constructed.

I have found that a circulating oiling system is well adapted for oiling the piston and a non-circulating oiling system is well adapted for oiling the sleeve valves.

By locating the inlet and outlet ports of the inner cylinder adjacent to the flat end wall of the cylinder, the trapping of the burned gases in the combustion space above the piston is prevented and the thorough scavenging of the said space is insured.

It is evident that changes may be resorted to in the form, construction and arrangement of the several parts without departing from the spirit and scope of my invention; and hence I do not wish to limit myself strictly to the structure herein set forth, but

What I claim is:

1. An explosion engine comprising a fixed cylinder, inner and outer telescoping sleeve valves working thereon and a piston working in said cylinder, said sleeve valves and cylinder having suitable inlet and outlet ports arranged to be brought into and out of coaction by the movement of said sleeve valves, the sleeve valve inlet ports opening by a movement of the sleeve valves in opposite directions and closing at the bottom of the cylinder port by a movement of the sleeve valves in the same direction.

2. An explosion engine comprising a fixed cylinder, inner and outer telescoping sleeve valves working thereon and a piston working in said cylinder, said sleeve valves and cylinder having suitable inlet and outlet ports arranged to be brought into and out of coaction by the movement of said sleeve valves, the sleeve valve inlet ports opening by a movement of the sleeve valves in opposite directions from a point about midway between the top and bottom of the cylinder port and closing at the bottom of the cylinder port by a movement of the sleeve valves in the same direction.

3. An explosion engine comprising fixed inner and outer concentric cylinders, inner and outer telescoping sleeve valves working between said cylinders and a piston working in the inner cylinder, said sleeve valves and cylinders having suitable inlet and outlet ports arranged to be brought into and out of coaction by the movement of said sleeves, the sleeve valve inlet ports opening by a movement of the sleeve valves in opposite directions and closing at the bottom of the cylinder ports by a movement of the sleeve valves in the same direction.

4. An explosion engine comprising fixed inner and outer concentric cylinders, inner and outer telescoping sleeve valves working between said cylinders and a piston working in the inner cylinder, said sleeve valves and cylinders having suitable inlet and outlet ports arranged to be brought into and out of coaction by the movement of said sleeves, the sleeve valve inlet ports opening by a movement of the sleeve valves in opposite directions from a point about midway between the top and bottom of the cylinder ports, and closing at the bottom of the cylinder ports by a movement of the sleeve valves in the same direction.

5. An explosion engine comprising a fixed cylinder, inner and outer telescoping sleeve valves working thereon and a piston working in said cylinder, said sleeve valves and cylinder having suitable inlet and outlet ports arranged to be brought into and out of coaction by the movement of said sleeve valves, the sleeve valve inlet ports opening by the downward movement of the inner sleeve and upward movement of the outer sleeve, and closing at the bottom of the cylinder port by a downward movement of both sleeve valves.

6. An explosion engine comprising a fixed cylinder, inner and outer telescoping sleeve valves working thereon and a piston working in said cylinder, said sleeve valves and cylinder having suitable inlet and outlet ports arranged to be brought into and out of coaction by the movement of said sleeve valves, the sleeve valve inlet ports opening by the downward movement of the inner sleeve and upward movement of the outer sleeve from a point about midway between the top and bottom of the cylinder port and closing at the bottom of the cylinder port by a downward movement of both sleeve valves.

7. An explosion engine comprising fixed inner and outer concentric cylinders, inner and outer telescoping sleeve valves working between said cylinders and a piston working in the inner cylinder, said sleeve valves and cylinders having suitable inlet and outlet ports arranged to be brought into and out of coaction by the movement of said sleeves, the sleeve valve inlet ports opening by the downward movement of the inner sleeve and upward movement of the outer sleeve and closing at the bottom of the cylinder ports by a downward movement of both sleeve valves.

8. An explosion engine comprising fixed inner and outer concentric cylinders, inner and outer telescoping sleeve valves working between said cylinders and a piston working in the inner cylinder, said sleeve valves and cylinders having suitable inlet and outlet ports arranged to be brought into and out of coaction by the movement of said sleeves, the sleeve valve inlet ports opening by the downward movement of the inner sleeve and upward movement of the outer sleeve from a point about midway between the top and bottom of the cylinder ports and closing at the bottom of the cylinder ports by a downward movement of both sleeve valves.

9. An explosion engine comprising a fixed cylinder, inner and outer telescoping sleeve valves working thereon and a piston working in said cylinder, said sleeve valves and cylinder having suitable inlet and outlet ports arranged to be brought into and out of coaction by the movement of said sleeve valves, the sleeve valve outlet ports opening off from the bottom of the cylinder port by an upward movement and closing onto the top of the cylinder port by the movement of the sleeve valves in opposite directions.

10. An explosion engine comprising a fixed cylinder, inner and outer telescoping sleeve valves working thereon and a piston working in said cylinder, said sleeve valves and cylinder having suitable inlet and outlet ports arranged to be brought into and out of coaction by the movement of said sleeve valves, the sleeve valve outlet ports opening off from the bottom of the cylinder port by an upward movement, with the inner sleeve valve traveling faster than the outer sleeve valve, and closing onto the top of the cylinder port by the movement of the sleeve valves in opposite directions with the inner sleeve valve traveling slower than the outer sleeve valve.

11. An explosion engine comprising fixed inner and outer concentric cylinders, inner and outer telescoping sleeve valves working between said cylinders and a piston working in the inner cylinder, said sleeve valves and cylinders having suitable inlet and outlet ports arranged to be brought into and out of coaction by the movement of said sleeves, the sleeve valve outlet ports opening off from the bottom of the cylinder ports by an upward movement, and closing onto the top of the cylinder ports by the movement of the sleeve valves in opposite directions.

12. An explosion engine comprising fixed inner and outer concentric cylinders, inner and outer telescoping sleeve valves working between said cylinders and a piston working in the inner cylinder, said sleeve valves and cylinders having suitable inlet and outlet ports arranged to be brought into and out of coaction by the movement of said sleeves, the sleeve valve outlet ports opening off from the bottom of the cylinder ports by an upward movement with the inner sleeve valve traveling faster than the outer sleeve valve, and closing onto the top of the cylinder ports by the movement of the sleeve valves in opposite directions with the inner sleeve valve traveling slower than the outer sleeve valve.

13. An explosion engine comprising a fixed cylinder, inner and outer telescoping sleeve valves working thereon and a piston working in said cylinder, said sleeve valves and cylinder having suitable inlet and outlet ports arranged to be brought into and out of coaction by the movement of said sleeve valves, the sleeve valve outlet ports opening off from the bottom of the cylinder port by an upward movement, and closing onto the top of the cylinder port by a downward movement of the inner sleeve valve and an upward movement of the outer sleeve valve.

14. An explosion engine comprising a fixed cylinder, inner and outer telescoping sleeve valves working thereon and a piston working in said cylinder, said sleeve valves and cylinder having suitable inlet and outlet ports arranged to be brought into and out of coaction by the movement of said sleeve valves, the sleeve valve outlet ports opening off from the bottom of the cylinder port by an upward movement with the inner sleeve valve traveling faster than the outer sleeve valve and closing onto the top of the cylinder port by a downward movement of the inner sleeve valve and an upward movement of the outer sleeve valve with the inner sleeve valve traveling slower than the outer sleeve valve.

15. An explosion engine comprising fixed inner and outer concentric cylinders, inner and outer telescoping sleeve valves working between said cylinders and a piston working in the inner cylinder, said sleeve valves and cylinders having suitable inlet and outlet ports arranged to be brought into and out of coaction by the movement of said sleeves, the sleeve valve outlet ports opening off from the bottom of the cylinder ports by an upward movement and closing onto the top of the cylinder ports by a downward movement of the inner sleeve valve and an upward movement of the outer sleeve valve.

16. An explosion engine comprising fixed inner and outer concentric cylinders, inner and outer telescoping sleeve valves working between said cylinders and a piston working in the inner cylinder, said sleeve valves and cylinders having suitable inlet and outlet ports arranged to be brought into and out of coaction by the movement of said sleeves, the sleeve valve outlet ports opening off from the bottom of the cylinder ports by an upward movement, with the inner sleeve valve traveling faster than the outer sleeve valve and closing onto the top of the cylinder ports by a downward movement of the inner sleeve valve and an upward movement of the outer sleeve valve with the inner sleeve valve traveling slower than the outer sleeve valve.

In testimony, that I claim the foregoing as my invention, I have signed my name this twenty-second day of December, 1915.

FINLEY R. PORTER.